United States Patent [19]

Einstman et al.

[11] 3,879,565
[45] Apr. 22, 1975

[54] COFFEE BREWING BAG AND METHOD

[75] Inventors: William J. Einstman, Port Chester, N.Y.; Warren C. Rehman, Montvale, N.J.; Frank M. Plant, Beacon, N.Y.

[73] Assignee: General Foods Corporation, White Plains, N.Y.

[22] Filed: Oct. 5, 1971

[21] Appl. No.: 186,804

[52] U.S. Cl. .................. 426/302; 426/78; 426/96; 426/193; 426/329; 426/394
[51] Int. Cl. ............................................ A23f 1/08
[58] Field of Search ............... 99/65, 71, 68, 77.1; 426/77, 433, 302, 329, 394, 78, 193, 96

[56] References Cited
UNITED STATES PATENTS

| | | | |
|---|---|---|---|
| 3,386,834 | 6/1968 | Noiset et al. | 426/77 X |
| 3,420,675 | 1/1969 | Costas | 99/77.1 |
| 3,511,666 | 5/1970 | Hudson et al. | 99/77.1 |
| 3,518,344 | 6/1970 | Welsh et al. | 99/77.1 X |
| 3,607,299 | 9/1971 | Bolt | 99/77.1 |
| 3,640,727 | 2/1972 | Heusinkveld | 99/77.1 |

OTHER PUBLICATIONS

National Academy of Sciences, Chemicals Used in Food Processing, 1965, p. 21.

*Primary Examiner*—Frank W. Lutter
*Assistant Examiner*—Neil F. Greenblum
*Attorney, Agent, or Firm*—Thomas R. Savoie; Daniel J. Donovan; Bruno P. Struzzi

[57] ABSTRACT

Roasted and ground coffee is packaged in a brewing bag for use in brewing a cup of coffee in the same manner that the ordinary tea bag is used to brew a cup of tea. An effective amount of a defoaming agent such as silicones is added to the coffee to disperse foam generated within the bag and to improve the rate of extraction of the coffee material. A bag volume of from 1.9 to 2.2 times the volume of coffee avoids the necessity of a defoaming agent.

2 Claims, No Drawings

COFFEE BREWING BAG AND METHOD

BACKGROUND OF THE INVENTION

This invention is directed to an improved coffee product in the form of roasted and ground coffee, plus a defoaming agent in a brewing bag. More particularly this invention pertains to coffee brewing bags which will produce a coffee beverage having flavor and aroma characteristics comparable to those normally associated with freshly brewed coffee and which will produce such a coffee beverage within a time period (about 2 minutes) comparable to that normally employed for tea bags.

It has long been desired to provide the consumer with a coffee bag which might be used in the same fashion as the conventional and popular tea bag and which would produce a high quality coffee beverage. Previous attempts of merely placing roast and ground coffee in lieu of tea into standard filter paper infusion bags have not proven successful. Among the difficulties encountered is that considerably more coffee than tea is required in a filter paper bag in order to produce a cup of quality coffee beverage, and that the time required to produce a flavorful cup of coffee beverage is considerably longer than that for tea.

We have found that another problem with placing conventional roasted and ground coffee into filter paper bags is that the coffee, when contacted with hot water, releases relatively large amounts of gas, mostly carbon dioxide, which is trapped within the bag. This entrapped gas is noticeable as an unsightly white-yellow foam within the bag which tends to cause the bag to float to the surface of the coffee cup providing an unpleasant appearance to the consumer. This entrapped gas also tends to retard extraction of the coffee material by apparently preventing good contact between the coffee and the extracting liquid. Additionally the floating bag may also tend to reduce extraction of the coffee as compared to a bag which remains submerged beneath the extracting liquid.

Attempts to increase the porosity of the infusion bags in order to permit escape of the gas have not proven successful because the increased porosity also permits increased amounts of coffee grounds to escape thereby producing an unsightly accumulation of sediment in the cup.

SUMMARY OF THE INVENTION

It has now been discovered that roasted and ground coffee plus an effective amount of a defoaming agent can be packaged in a filter paper infusion bag such that a good quality brewed coffee beverage will be obtained within about 2 minutes when the bag is combined with hot water.

In general, the present invention contemplates infusion bags of the type normally associated with the term tea bags. This article may correspond to infusion bags of the type such as that illustrated by U.S. Pat. No. 2,571,138 issued to Irmscher. Obviously infusion bags of varying designs may be employed in this invention, such as the "flow-through" bag of U.S. Pat. No. 2,593,608; however, care should be taken to produce a bag of minimum volume, such that the bag may be combined with sufficient hot water in a small brewing container, such as a conventional six ounce coffee cup, to produce a desired quantity of coffee beverage.

The bag material may be comprised of a thin, porous filter paper, preferably coated on at least a portion of one side with a thermoplastic material which will become adhesive upon being subjected to heat and pressure, thus enabling formation of the bag by a heat sealing operation. Conventional tea bag material has proven satisfactory for use in this invention. It is also possible to use for the coffee infusion bag of this invention material which has a porosity somewhat greater than conventional tea bag material; however, care should be taken to prevent excessive amounts of insoluble coffee material from passing through the bag material. Screening and/or pelletizing the roasted and ground coffee may be employed to reduce the amount of fine coffee material present within the infusion bag.

The roasted and ground coffee material used in this invention may be any single variety of coffee, but is usually a blend of different varieties. The blend may be formulated either before or after roasting and/or grinding. Obviously the coffee may be decaffeinated or undecaffeinated.

DESCRIPTION OF THE PREFERRED EMBODIMENT

According to this invention a new product, comprised of roasted and ground coffee and a defoaming agent, is packaged in a filter paper infusion bag. This invention overcomes the difficulties encountered with prior art coffee bag, and permits the production of a quality coffee beverage, in a manner similar to that used for conventional tea bag, within a time period of about 2 minutes.

It has been found that the defoaming agent should be relatively uniformly coated or plated onto at least a portion of the roasted and ground coffee before the coffee is packaged within the infusion bag. Merely coating the infusion bag material with the defoaming agent has not proven successful for the purpose of this invention.

It has also proven desirable to remove from the roasted and ground coffee fine particles having a size less than about 40 U.S. mesh (about 420 microns) in order to reduce both dust escaping from the bag during handling and insoluble sediment occurring in the cup of brewed beverage. Removal of this fine material may be done by conventional screening techniques.

Surprisingly, it has been found that it may be desirable to permit some sediment to occur within the brewed beverage in order to satisfy the preference of some consumers who are accustomed to observing sediment in fresh brewed coffee beverages. Amounts of sediment up to about 300 milligrams (mgs.) per 6 ounces of coffee beverage have been found to be acceptable, with amounts of about 100 to 200 mgs. per 6 ounces being a desirable level. The level of cup sediment may be adjusted by varying the porosity of the infusion bag material and/or the screening level for the roasted and ground coffee.

The defoaming agent, although functioning within the infusion bag, must be edible since a portion of this material will pass through the bag into the brewed beverage. Usually effective amounts of the edible defoaming agent are spray plated on to the surface of the roasted and ground coffee as a dilute dispersion or an emulsion. This technique will permit a small quantity of the defoaming agent to be spread relatively uniformly over the roast and ground coffee material. Alternatively, only a portion of the coffee material may be coated with the defoaming agent with this coated portion then being throughly mixed with the remaining coffee.

The defoaming agents useful in this invention should be a material acceptable for use in foods, such as dimethyl-polysiloxane (see 21 C.F.R.121.1099). The defoaming agent may be suspended or dissolved in a carrier or emulsified in a liquid medium with the aid of suitable emulsifiers. Aqueous emulsions of dimethyl-polysiloxane have proven especially useful in this invention. These defoaming agents may be employed in this invention by spraying relatively dilute solutions or emulsions onto the roasted and ground coffee in an amount sufficient to effect production of a quality coffee beverage from a coffee brewing bag within a time period of about 2 minutes. It is thought that the defoaming agent has the ability to enable the entrapped gas to pass through the infusion bag material, thus reducing the tendency of the bag to float, and/or to release the gas bubbles from the surface of the coffee material thus permitting better contact between the coffee and the extracting liquid. Each of these features would apparently enable a faster extraction of the roasted and ground coffee to occur.

It has been found that the levels of active defoaming agent (e.g., dimethylpolysiloxane) preferred for use in this invention is between 20 and 1,600 and most preferably between about 40 and 120 parts per million (ppm) based on the weight of the roast and ground coffee. At levels below 20 ppm sufficient flavorful soluble coffee solids are not able to be extracted within a time period of about 2 minutes; while, at a level of above 1,600 ppm, appreciably faster extraction rates are not obtained. The levels between about 40 and 120 ppm have been found to be preferred since in this range the improvement in extraction rate per unit weight of defoaming agent is at a maximum.

It should be noted that producing a flavorful cup of coffee is more than a mere function of the amount of soluble coffee solids present in the beverage. Soluble coffee solids consist of many chemical compositions which are not all extracted from the roasted and ground coffee at the same rate. Each of these compositions contributes to the production of the taste and aroma normally associated with fresh brewed coffee. Thus in comparing coffee beverages containing varying amounts of soluble solids, a slight difference in the amount of soluble solids may translate into a much more dramatic difference in taste and aroma.

Obviously this invention can be used to produce coffee infusion bags of varying sizes such that one or more cups of coffee beverage may be produced from a single bag; however, because of the amount (about 10 grams) of roasted and ground coffee required to produce a single cup of quality coffee beverage, single cup brewing bags will be the most preferred embodiment of this invention. By using a defoaming agent in accordance with this invention, a single cup brewing bag can be prepared which will produce a quality coffee beverage with an extraction time in hot water of about 2 minutes, while having a bag size noticeably smaller than the size that would be required to produce comparable extraction absent a defoaming agent. The brewing bag should be of a size such that the maximum internal volume of the bag is less than 2 times, and preferably about 1.5 to 1.8 times the volume of the enclosed roasted and ground coffee, the coffee volume being the volume before the coffee is wetted. Presence of the defoaming agent enables the smaller bags of this invention to be made from filter paper infusion bag material which has sufficiently low porosity that less than 300 mgs., and preferably less than 200 mgs. of coffee sediment will be found per 6 ounces of coffee beverage.

As a result of this invention it has additionally been determined that the requirements of a single cup brewing bag of producing a flavorful cup of coffee with an extraction time of about two minutes and with a sediment level of less than 300 mgs., preferably less than 200 mgs., per 6 ounces of coffee beverage can be obtained without the use of a defoaming agent, if a certain critical ratio of internal bag volume to coffee volume is employed. This ratio has been found to be from 1.9 to 2.2. Apparently at this critical volume there is just enough free space to accomodate within the bag but away from the roasted and ground coffee, the gas released from the coffee but insufficient brewing bag size to occupy an excessively large volume in the cup, thus making the product unattractive to the consumer.

The brewing bags will preferably be packaged in vacuum containers similar to regular roasted and ground coffee. It is also within the scope of this invention to include additional materials within the coffee brewing bag such as spray dried or freeze dried soluble coffee solids, various flavor and aroma enhancers and sweetening and lightening compositions.

This invention is further described but not limited by the following examples.

EXAMPLE 1

A plurality of infusion bags were prepared, each bag having dimensions of approximately 2.5 by 2.5 inches of brewing surface per side and having a maximum internal volume of about 47.5 cc. The bag material was a commercial tea bag material (Dexter 1234) being characterized as a hemp-wood pulp filter paper having a polyvinyl acetate heat seal coating on one side and having a porosity of 430±55 cubic feet of air per minute per square ft. at 0.5inches of water pressure. Ten grams of roasted and ground (percolator grind) coffee having a volume of about 28.3 cc., having the minus 40 U.S. mesh fraction removed by screening and having differing levels of an aqueous silicone emulsion (Hodag FD62 — 10 percent by weight dimethylpolysiloxane) spray coated thereon was packaged in each of the infusion bags. Each bag was placed in a standard 8 ounce coffee cup to which was added 6 ounces (177 mls) of boiling water. The bags were brewed for 2 minutes each bag being agitated in an identical manner during the brewing period. At the end of the 2 minute brewing period the bags were removed and allowed to drain into the cup. The brewing results are tabulated below, each result being the average of at least six separate experiments. In each instance the amount of sediment per cup was found to be less than 200 mgs.

TABLE 1

| dimethylpolysiloxane (ppm) | total solids (%) | brew quality |
| --- | --- | --- |
| 0 | 0.70 | thin, acidic |
| 40 | 0.77 | thin, acidic, some good flavor notes |
| 80 | 0.87 | slightly thin, moderate impact, good |

TABLE 1-Continued

| dimethylpolysiloxane (ppm) | total solids (%) | brew quality |
|---|---|---|
| 120 | 0.86 | balance slightly thin, good balance |
| 400 | 0.88 | good balance |
| 1600 | 0.97 | good balance, good flavor notes |

EXAMPLE 2

Employing the bag material described in Example 1 and using 10 grams of roasted and ground coffee per bag as described in claim 1, but free of any defoaming agent, additional bags were prepared. Keeping the width a constant 2.5 inches, larger size bags, having heights of 2.75 inches and 3.0 inches and having respective maximum internal volumes of about 55 cc and 61 cc., were used to produce cups of coffee beverage in the manner set forth in Example 1. The brewing results are tabulated below, each results being the average of at least five separate experiments. In each instance the amount of sediment per cup was found to be less than 200 mgs. and during brewing a white-yellow foam was noticeable within the bag.

TABLE 2

| bag height (inches) | total solids (%) | brew quality |
|---|---|---|
| 2.75 | 0.97 | thin, acidic, low impact |
| 3.0 | 1.01 | thin, acidic, slightly unbalanced |

Having thus described the invention what is claimed is:

1. A process for making a coffee brewing bag comprising spraying an aqueous emulsion of dimethylpolysiloxane onto the surface of roasted and ground coffee to obtain a dimethylpolysiloxane level of from 20 to 1,600 ppm by weight of the coffee and then packaging the coffee in a filter paper infusion bag.

2. The process of claim 1 wherein the amount is about 40 to 120 ppm by weight of the coffee.

* * * * *